A. G. WARREN.
DUST COLLECTOR.
APPLICATION FILED APR. 3, 1916.

1,268,304.

Patented June 4, 1918.
4 SHEETS—SHEET 1.

WITNESS
William J. Jacobson

INVENTOR
Ambrose G. Warren
BY
Robert M. Barr
ATTORNEY

A. G. WARREN.
DUST COLLECTOR.
APPLICATION FILED APR. 3, 1916.

1,268,304.

Patented June 4, 1918.
4 SHEETS—SHEET 4.

WITNESS
William J. Jackson

INVENTOR
Ambrose G. Warren
BY Robert M. Barr
ATTORNEY

UNITED STATES PATENT OFFICE.

AMBROSE G. WARREN, OF BEVERLY, NEW JERSEY.

DUST-COLLECTOR.

1,268,304.

Specification of Letters Patent.

Patented June 4, 1918.

Application filed April 3, 1916. Serial No. 88,470.

*To all whom it may concern:*

Be it known that I, AMBROSE G. WARREN, a citizen of the United States, residing at Beverly, in the county of Burlington and State of New Jersey, have invented a certain new and useful Improvement in Dust-Collectors, of which the following is a specification.

The present invention relates to dust collectors or devices for separating from the air various kinds of dust or dirt in a finely divided state, such as unconsumed carbon from smoke, sawdust from the air of mills, and all kinds of floating dust particles common to foundries, coal breakers, grain mills, gas works and the like.

In devices of this character which have heretofore been devised and used, it has been found in practice that the separating means employed for catching and removing the dust and dirt particles from the moving body of air becomes clogged with collected dust whereby the efficiency of the device is materially impaired and also in some types the screens or dust straining means are so arranged as to form positive pockets in which the separated dust collects in quantities which gradually increases and thereby steadily decreases the square feet of operative screening material.

It is the object of my invention to provide a mechanism wherein the foregoing defects are overcome and whereby any collected dust or dirt tending to reduce the efficiency of the device can be at once removed without discontinuing the operation of the collector and whereby the square feet of separating surface remains substantially constant thereby giving a uniform efficiency.

For the purpose of illustrating my invention, I have shown in the accompanying drawings, one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings.

Figure 1:
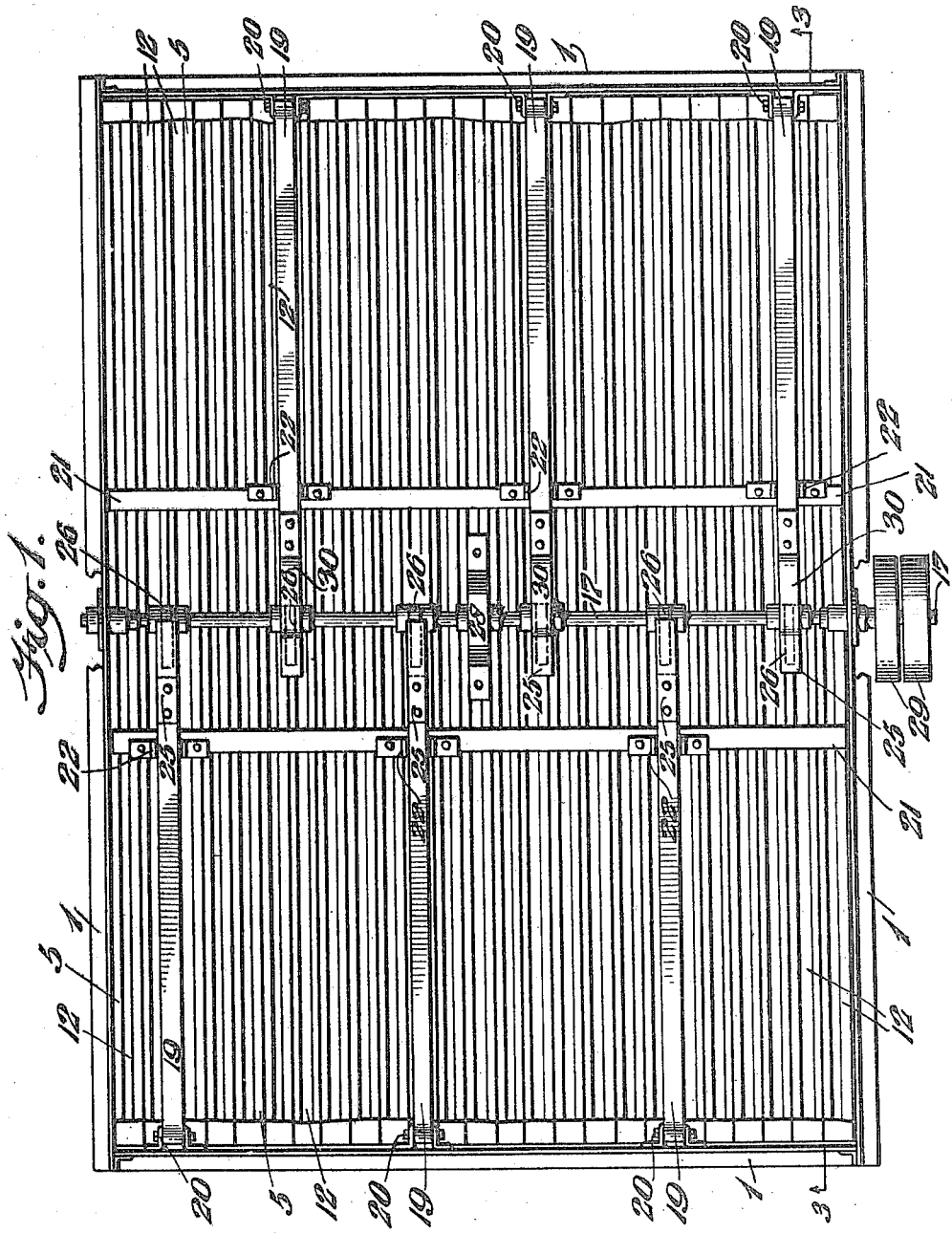
Figure 1 represents a plan of a dust collector embodying my invention, the top section being removed.
Figure 2:
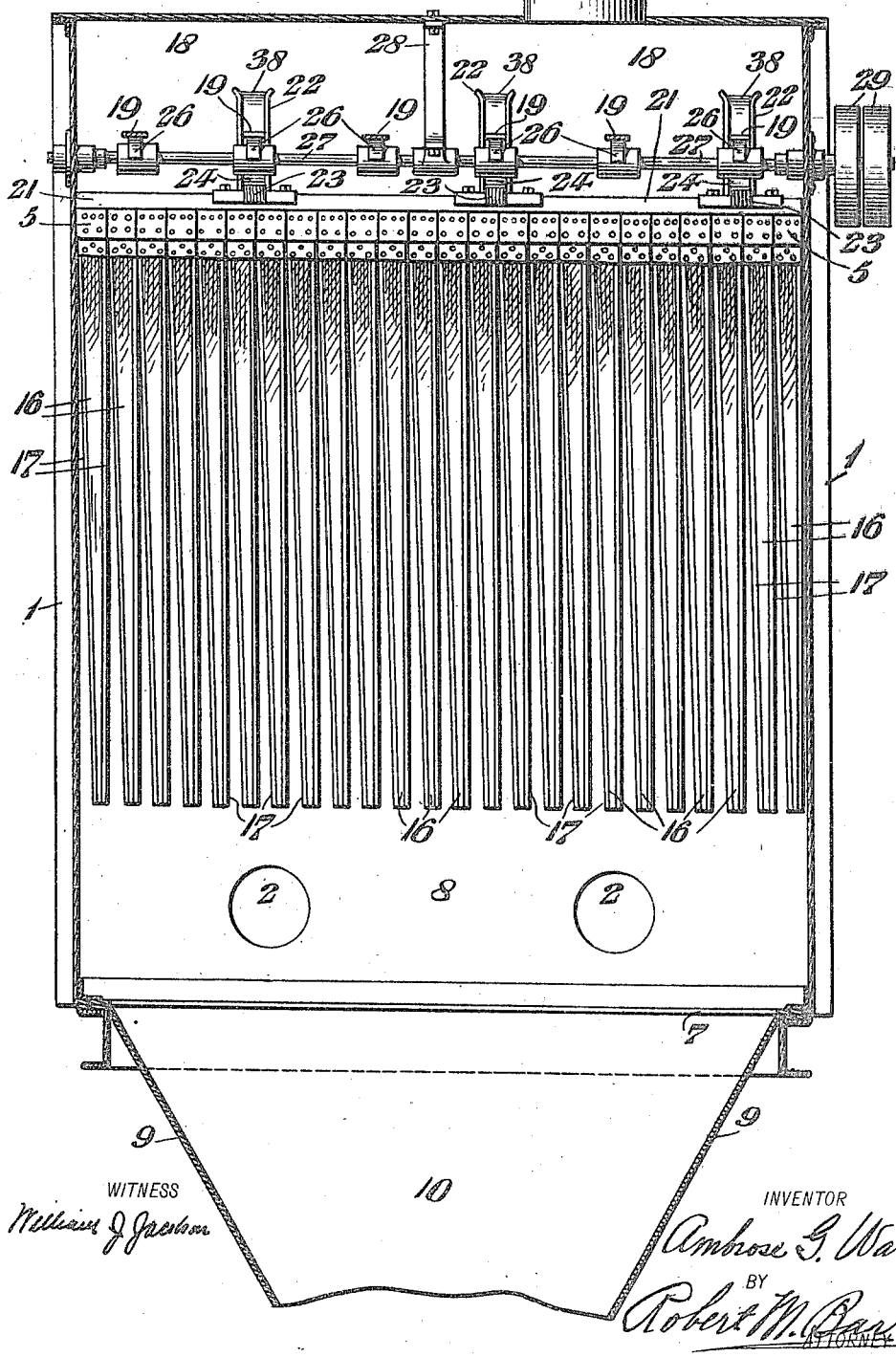
Fig. 2 represents a sectional elevation on line 2—2 of Fig. 3.
Figure 3:
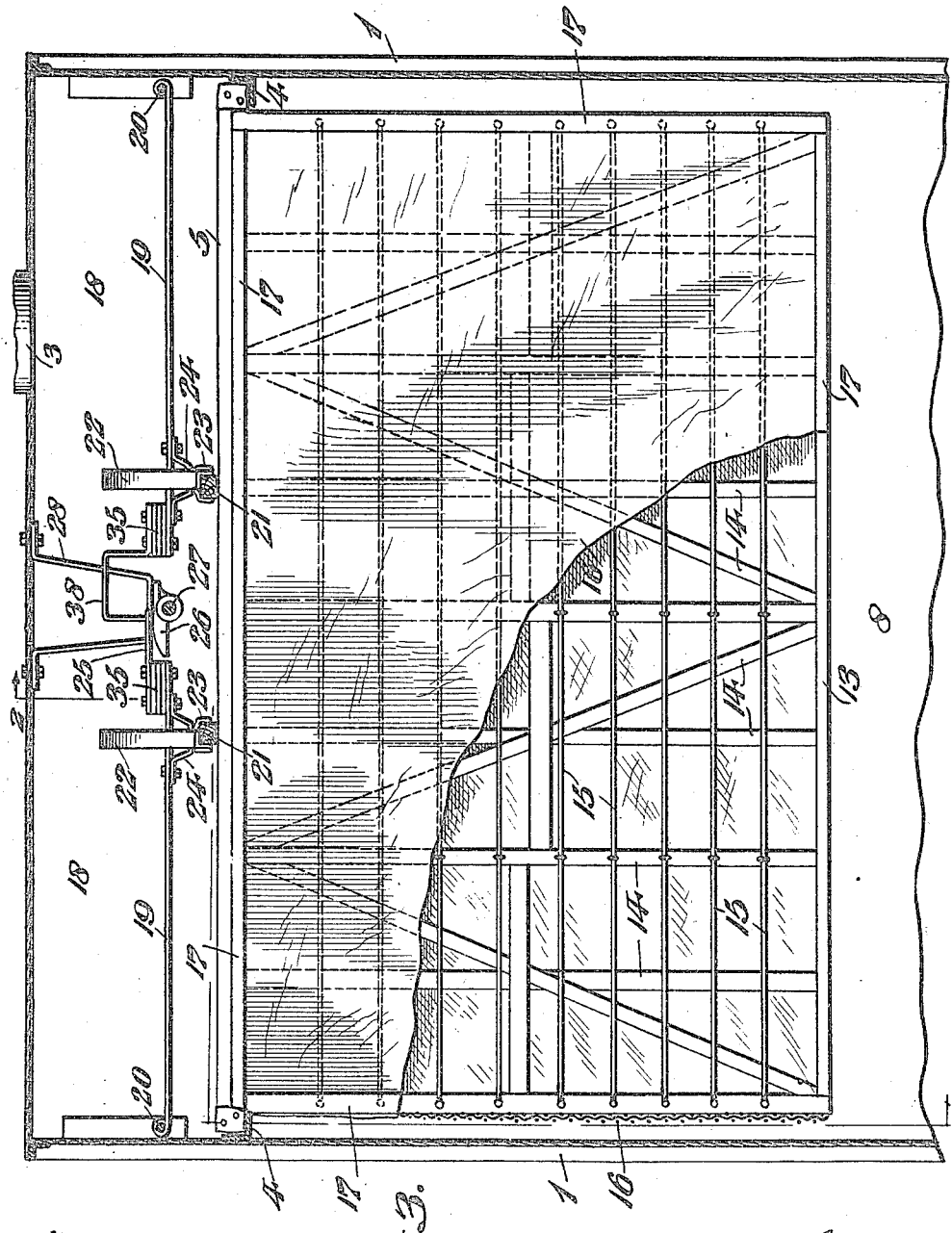
Fig. 3 represents a side sectional elevation on line 3—3 of Fig. 1.
Figure 4:
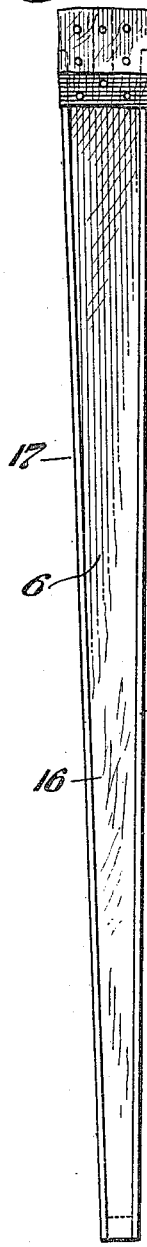
Fig. 4 represents an end elevation of one of the screens or separating devices.
Figure 5:
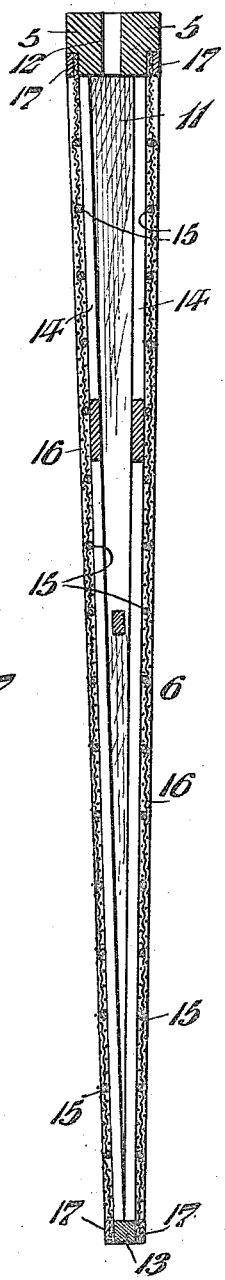
Fig. 5 represents a transverse section of one of the screens.
Figure 6:
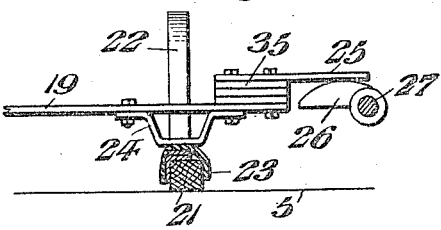
Fig. 6 represents a detail of one of hammers or impact devices.
Figure 7:
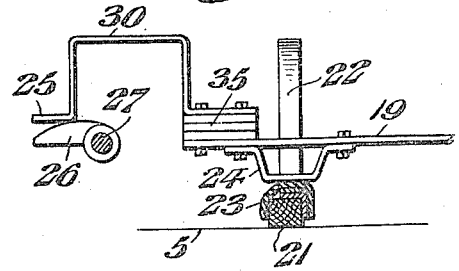
Fig. 7 represents a similar view of another of the hammers.
Figure 8:
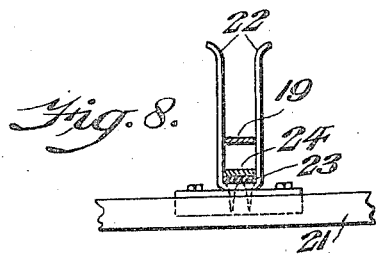
Fig. 8 represents a detail showing the guide means for the hammers.

1 designates the main casing of the dust collecting device, the same having an air inlet or inlets 2 preferably positioned adjacent the bottom of the casing and an exhaust or suction outlet 3 communicating with the interior of the casing adjacent the top. The outlet 3 leads by way of a conduit to a suitable source of suction, not shown in the drawing, such as a fan or the like, as will be understood. Two opposite walls of the casing 1 are provided respectively with supports or brackets 4, preferably in the form of angle irons which extend substantially from one side of the casing to the other. The top pieces 5 of the respective screens 6 rest at each end upon these supports 4 so that the body part of the screen depends or hangs within the main chamber of the casing 1. It will be noted, however, that the several screens terminate a sufficient distance above the bottom plane 7 of the casing in order to form a distinct inlet chamber 8 for the incoming dust laden air. The bottom of the chamber as here shown is formed with downwardly converging walls 9 which provide one or more discharge hoppers 10 from which the collected dust may be readily removed as found necessary. Since the number of screens is optional and depends upon the square feet of air space to be taken care of, it will be understood that I am not to be restricted to any exact number. Further, since the screens are all preferably of the same construction, I shall confine this description to one and apply the same reference numerals to all like parts in all the screens.

Each screen therefore consists of the top pieces 5 secured to end hangers 11, the upper ends of which are rabbeted to receive the top pieces in spaced relation and provide a longitudinal slot or opening 12 extending substantially the length of the screen and forming an outlet for the air passing through the screen. 13 designates the bottom pieces of the screen frame and it will be noted that the width of these pieces is less than the same dimension of the top pieces and consequently the assembled screen tapers downwardly and has a cross-section which is substantially V-shaped. Such construction is particularly advantageous in preventing the improper collection of dust in corners or pockets from which it cannot be readily removed and since the screens hang substantially vertical the space between adjacent screens has the shape of an inverted V. All dust or collected dirt therefore has a free, unobstructed path from the screen surface to the hoppers and the danger of portions of the screen surface becoming clogged is eliminated and since the entire surface is operative at all times, uniform efficiency is maintained. Returning to the structure, it will be understood that suitable vertical, horizontal or diagonal braces 14 are employed to form a strong body or frame-work for the separating material and to these braces I preferably secure a plurality of wires, cords or the like 15 at each side of the frame, and over which the separating or screening fabric 16 is stretched and securely fastened to the frame structure by battens 17 or the like. The wire 15 or equivalent means, being between the material 16 and the source of suction, holds the separating material of the two sides properly spaced thus preventing sagging or drawing together and reducing the area of the working surface.

In connection with the top pieces 5, it will be noted that the ends thereof project beyond the side edges of the screen frames so that the latter closely abut the supports 4 when the said ends are in operative position resting upon the supports 4. In order to form a substantially dust proof joint at these supporting points, I preferably wrap or inclose the said ends of the top pieces with cloth or other suitable material and the dust laden air is consequently prevented from leaking around the ends as will be understood. The path of the moving body of air is therefore through the inlets 2 to the chamber 8 and upwardly between the screens, passing vertically through the screening fabric 16 which separates the dust particles from the air conveying medium and the latter in purified condition is drawn out of the upper chamber 18 by the suction in the outlet conduit 3. The chamber 18 is preferably provided by spacing the screen supports 4 a suitable distance from the top of the casing 1 so that adjuncts of the mechanism may be conveniently located therein.

This mechanism consists of certain mechanical devices for striking or imparting a blow to the several screens to cause any accumulated dust or particles of dust improperly adhering to the screen surface or parts to be jarred loose or shaken off by the impact of the said device. In the present instance, this mechanism comprises a plurality of striker bars 19 suitably pivoted to the wall or walls of the casing, as shown at 20, so that the said bars are adapted to move toward and away from the screens, the latter movement being preferably a mechanical one while the former is under the action of gravity. Each of the bars 19 carries a weight or weights 35 at the free end for causing a quick return of the bar and also striking a relatively forcible blow necessary for the desired action. 21 designates a pair of cross beams or bars suitably fixed in contact with the top pieces of the screens and having at suitable spaced intervals, corresponding to the positions of the striker bars 19 substantially U-shaped guide members 22 for preventing displacement or lateral movement of the said bars 19 during the striking operation. Preferably a strip of suitable sound deadening material 23 such as leather or the like is interposed between the blow receiving portion of the respective guides 22 and the striker part 24 of the bars 19. Each of the bars 19 is also provided with an extension arm or trip finger 25 which is adapted to transmit motion of the operating part to the bar and cause it to be raised as required. This operating mechanism comprises a series of cams 26 fixed for rotation upon the driven shaft 27 which is suitably journaled in hangers 28 and is controlled by the fixed and idle pulleys 29. As here shown there are two sets of the bars 19 one being at one side of the shaft 27 and the other at the opposite side and in view of this construction, it will be noted that the trip fingers of one set are longer than the opposite fingers and provided with an offset 30 so that the action of the cams is the same upon both sets of strikers and the blows delivered are practically the same in each instance. In practice it is customary to operate the striking mechanism intermittently, that is to say, for a relatively long period it will remain idle and then be brought into action only long enough to free any accumulated dust or dirt. This is of course optional with the user of the collector and I do not limit myself in the present disclosure to any particular specified time or intermittent period for the use of the strikers, as obviously they can be continuously operated should it be desired to do so.

The device operates in the following manner: The blower or suction element being in operation induces a current of air through the collector casing by way of the inlet or inlets 2, chamber 8 and outlet 3. This body of moving air is therefore drawn through the filtering fabric of the screens and the dust, dirt or like deleterious particles are separated from the air and fall or settle into the hoppers provided for the purpose. In view of the fact that the screens are preferably supported with the long dimension in a substantially horizontal position, so that the sides of the respective screens converge downwardly, it is evident that the dust particles have a free unobstructed path which carries them direct to the hopper or collecting receptacles. In other words, the screens are so arranged as to prevent any falling dust particles from striking or settling upon another part of the screen. I am aware that it has heretofore been proposed to employ a plurality of substantially vertical screens set in serrate arrangement above a discharge aperture and in the path of a current of air but in such a structure, it has been found that it is a common occurrence for the falling dust particles to strike and adhere to the lower corners of the screens where it becomes so packed and clogged as to seriously impair the operation of the machine. Furthermore, this tendency of the dust to improperly collect is greatly increased by the transverse direction of flow of the current of dust laden air since this latter enters the collecting chamber at substantially right angles to the direction of the separated and falling particles of dust.

My present invention is clearly differentiated from a structure such as outlined since the dust laden air enters the collection chamber and moves therein in a path substantially parallel to the path of the falling particles and therefore does not tend to alter the course of such particles or drive them into corners where collection can occur.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

In apparatus of the character described, a casing, a plurality of depending screens arranged within the casing, a pair of spaced bars extending transversely of the screens and contacting with the upper ends thereof, a horizontal shaft extending transversely of the screens and arranged above the same and at a point substantially equidistantly spaced from the ends thereof, sets of hammer bars arranged upon opposite sides of said shaft and provided near their inner ends with weights, means to pivotally connect the outer ends of the hammer bars with the casing to swing in a substantially vertical plane, U-shaped guides substantially vertically arranged and secured to the pair of spaced transverse bars and receiving the hammer bars therein, a set of substantially straight trips secured to the inner ends of one set of hammer bars, inverted U-shaped trips secured to the inner ends of the other set of hammer bars, cams rigidly secured to the horizontal shaft and having lifting faces extending in the same direction and adapted to contact with the straight trips and the U-shaped trips, means to rotate the shaft, and air supply means connected with the lower end of the casing.

In testimony whereof, I have hereunto signed my name.

AMBROSE G. WARREN.

Witnesses:
 CHAS. P. FLAHERTY,
 I. F. KREMER.

Copies of this patent may be obtained for five cents each, by addressing the "Commissioner of Patents, Washington, D. C."